United States Patent Office 2,740,553
Patented Apr. 3, 1956

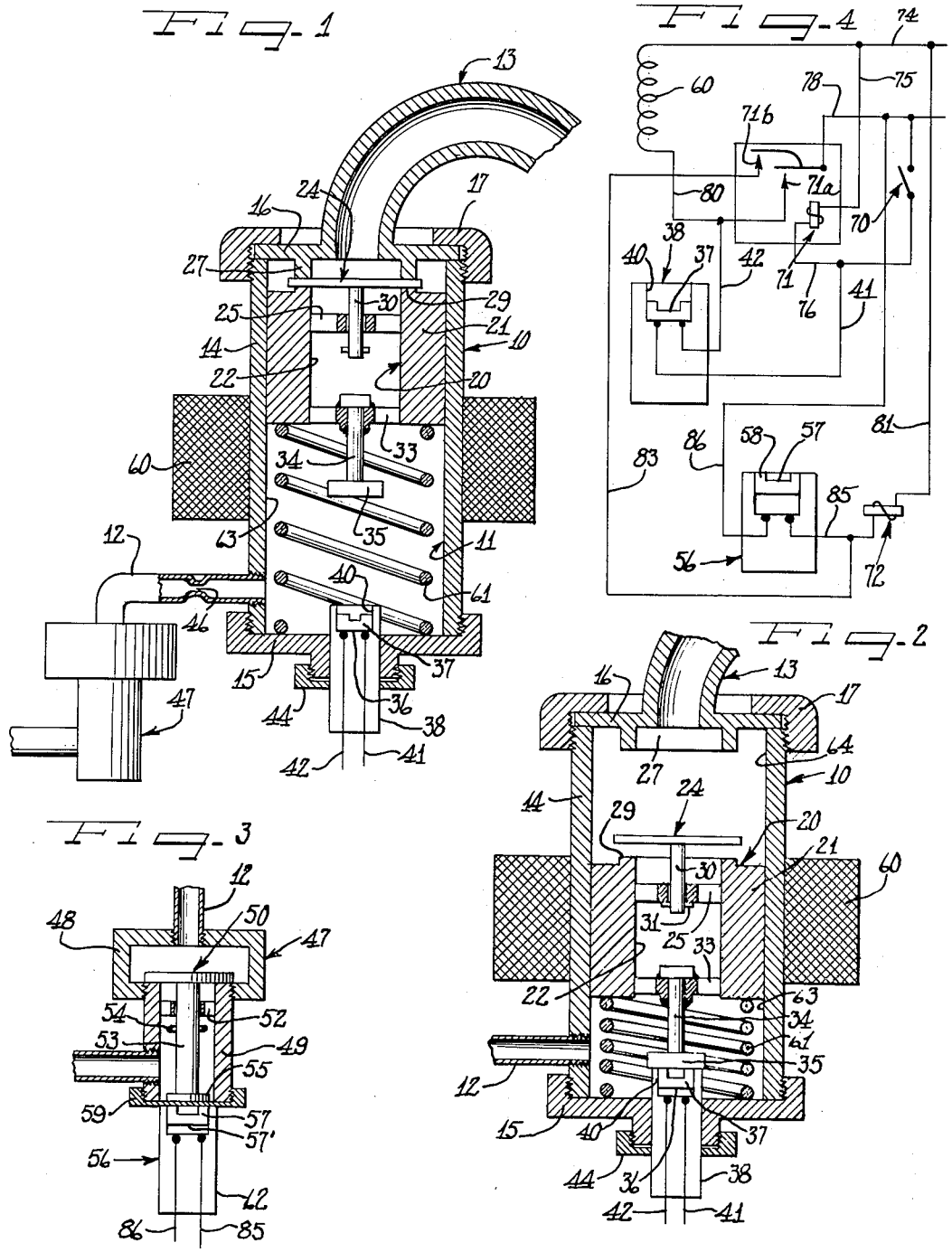

2,740,553

AUTOMATIC MEASURING LIQUID DISPENSER

Charles A. Maynard, Valparaiso, Ind., assignor to The Indiana Steel Products Company, Valparaiso, Ind., a corporation of Indiana Application September 5, 1952, Serial No. 308,017

7 Claims. (Cl. 222—2)

This invention relates to an automatic measuring liquid dispenser and more particularly to a coin operated automatic measuring liquid dispenser and electric control circuit therefor.

It is an important object of the present invention to provide a novel automatic measuring liquid dispenser.

It is a further important object of the present invention to provide a dispenser wherein the moving parts are completely contained within the dispenser chamber.

It is a further important object of the present invention to provide a novel automatic measuring liquid dispenser which is operated from the exterior of the dispenser chamber and without any moving parts extending through the chamber walls.

It is a further important object of the present invention to provide a novel plunger structure for actuating an automatic liquid dispenser.

It is a further important object of the present invention to provide a novel electric control switch for actuation by moving elements within a liquid chamber or the like.

It is a still further object of the present invention to provide a novel control circuit for an automatic measuring liquid dispenser.

It is a more specific object to provide such a control circuit for a coin operated automatic measuring liquid dispenser.

Other objects, features and advantages of the invention will be readily apparent from the following detailed description of a preferred embodiment thereof taken in conjunction with the accompanying sheet of drawings, in which:

Figure 1 is a longitudinal sectional view of an automatic measuring liquid dispenser constructed in accordance with the teachings and principles of the present invention;

Figure 2 is a fragmentary longitudinal sectional view of the dispenser of Figure 1 illustrating the dispenser plunger in its retracted position;

Figure 3 is a fragmentary longitudinal sectional view of the back pressure valve in the inlet to the liquid dispenser chamber; and Figure 4 is a schematic view of an electrical control circuit for the dispenser valve shown in Figure 1.

In the illustrated embodiment of the invention, the dispenser comprises a hollow body 10 defining a dispenser chamber 11 having an inlet 12 communicating therewith at the lower portion of the body and an outlet 13 communicating therewith at the top of the body. More particularly the body 10 is illustrated as comprising a cylindrical body portion 14, of non-magnetic material, closed at its lower end by means of a cap 15 threaded thereto and closed at its upper end by an annular flange 16 integral with the outlet 13 and secured to the body portion 14 by means of a clamping member 17 threaded onto the upper end of the body portion.

A piston member 20 is slidably carried within the body 10 for effecting the dispensing action. The member includes a sleeve 21 of magnetic material slidably mounted within the body portion 14 and having a central bore 22. A valve member 24 is reciprocally carried on the sleeve 21 by means of a spider 25 within the bore 22. The upper surface of the valve 24 cooperates with an annular seat 27 formed integrally with the flange 16 of the outlet 13. The lower surface of the valve 24 coacts with an annular seat 29 formed integrally with the sleeve 21. It will be observed that the stem 30 of the valve 24 is reciprocally mounted by means of the spider 25 and as indicated in Figure 2 upward movement of the valve 24 from its seat 29 is limited by means of the pin 31 carried by the stem 30 below the spider 25.

At the lower end of the sleeve 21 a spider 33 is fixedly secured to a pin 34 having at its lower end a plug 35 of steel or other magnetic material. This plug 35 cooperates with a permanent magnet 37 reciprocally mounted in a housing 38 extending through the cap 15 into the dispenser chamber 11. The permanent magnet 37 has a conducting undersurface 36 which normally bridges leads 41 and 42. However, as indicated in Figure 2, when the plug 35 is in its lower position it attracts the permanent magnet 37 which moves upwardly in its recess 40 to open the circuit between leads 41 and 42. It will be understood that the permanent magnet 37 is enclosed within its recess 40 and is not exposed to liquid within the dispenser chamber 11. The housing 38 is readily detachable from the body 10 by means of threaded collar 44 for replacement of the permanent magnet should such become desirable.

As illustrated in Figures 1 and 3, the inlet 12 is provided with a restricted orifice 46 and a back pressure valve 47 for purposes which will hereinafter be set forth. The back pressure valve 47 includes a cylindrical housing portion 48 and a tubular housing portion 49 depending therefrom. A valve member 50 cooperates with the upper end of the housing portion 49 to control a flow of fluid in the inlet 12. A spider 52 carried by the housing portion 49 guides the stem 53 of the valve 50 and the stem has a pin 54 for limiting movement of the valve in the opening direction. At the lower end of the stem 53, a plug 55 of steel or other magnetic material is carried for operating a switch 56 which is similar to the switch 38 associated with the dispenser body 10, and includes a permanent magnet 57 reciprocally mounted in a recess 58 of a housing 62 connected with the housing portion 49 by means of a collar 59 threadedly engaging therewith. The permanent magnet 57 has a conductive undersurface 57' normally bridging leads 85 and 86.

A solenoid 60 is mounted on the exterior of the body 10 and is operative to retract the piston member 20 against the action of the compression spring 61 acting on the lower end of the sleeve 21. As the piston member 20 is retracted, as shown in Figure 2, since the back pressure valve 47 prevents reverse flow of liquid in the inlet 12, fluid pressure in the lower inlet chamber 63 of the body 10 will unseat the valve 24, allowing liquid to flow through the bore 22 of the sleeve 21 and into the upper outlet chamber 64 of the dispenser. At the bottom of the stroke, the plug 35 causes the permanent magnet to open the circuit of leads 41 and 42. When the solenoid is deenergized, the spring 61 is operative to drive the plunger member 20 upwardly. During upward movement, the pressure in the upper outlet chamber will cause the valve 24 to close so that further upward movement of the plunger 20 will cause a measured amount of liquid to be discharged through the outlet 13 of the dispenser. The restricted orifice 46 prevents pressure from the inlet from unseating the valve 24 during the return dispensing stroke.

The operation of the control circuit shown in Figure 4 will now be readily understood. The switch 70 may be momentarily closed by insertion of a coin in the dispenser. The coin-controlled mechanism for closing the switch 70 may, for example, be that described in Patent No. 1,786,014. When this occurs, the relay 71 is energized to energize the solenoid 60 and the relay 72 which may be a coin window lock locking relay to prevent the insertion of any further coins until the dispensing cycle has been completed.

The initial energizing circuit for the relay 71 extends from supply line 74 through conductor 75, relay 71, conductor 76, and switch 70 to supply conductor 78. A holding circuit for the relay 71 is established through conductor 41, switch 38, the permanent magnet conducting undersurface 36, conductor 42, conductor 80, relay contact 71a to supply conductor 78.

The energizing circuits for the solenoid 60 then extend from supply conductor 74, through the solenoid, through conductor 80, and relay contact 71a to the supply conductor 78.

The energizing circuit for the coin window locking relay 72 extends from the supply conductor 74 through the conductor 81, through relay 72, conductor 83, and relay contact 71b to supply conductor 78. When the solenoid 60 has retracted the piston member 20 to its lower position, the permanent magnet 37 is unseated to open the holding circuit for the relay 71 thus opening the energizing circuit for the solenoid 60 and which, in turn, opens the energizing circuit for the coin window locking relay 72. The spring 61 now acts to return the piston member 20 to its upper position to dispense the liquid and to draw liquid into the inlet chamber 63 through the inlet 12. This in-flow of liquid to the inlet 12 is sufficient to unseat the valve 50 to close switch 56 by allowing the permanent magnet 57 to descend in the recess 58 to bridge the conductors 85 and 86. Closure of the switch 56 completes another energizing circuit for the coin door locking relay 72 from supply conductor 74 through conductor 81, relay 72, conductor 85, switch 56 and conductor 86 to supply conductor 74. If desired, the relay 72 may be of the time delay type so that the control circuit would maintain the relay 72 sufficiently energized during the entire cycle of dispensing operation to prevent insertion of another coin. When the piston member 20 has returned to its initial position, the valve 50 assumes its closed position, thus opening the switch 56 to deenergize the coin door locking relay 72 to permit a new coin to be inserted into the mechanism to initiate a further cycle.

The Tratsch U. S. Patent No. 2,249,236 illustrates a coin actuated switch 80 associated with a coin chute and a coin selecting gate mechanism 93, 94, 95, 96. It will be obvious that the relay 72 in Figure 4 could be arranged to actuate the gate mechanism of Tratsch to return coins and that the switch 70 of Figure 4 could be actuated by the coin sensing lever 81 of Tratsch.

It will be understood that variations and modifications may be effected without departing from the scope of the novel concepts of the present invention.

I claim as my invention:

1. A measuring liquid dispenser comprising a dispenser housing having a dispensing chamber therein, a piston movable within said discharge chamber and separating the chamber into an inlet chamber and an outlet chamber, magnetic material carried by said piston and movable with said piston from a position adjacent a wall of said housing to a remote position, a permanent magnet carried by said wall of said housing for cooperation with said magnetic material, means reciprocally mounting said permanent magnet for movement toward said magnetic material when the magnetic material is in its position adjacent said wall, a solenoid for retracting said piston member toward said permanent magnet having an energizing circuit controlled by said permanent magnet and being opened upon full retraction of said piston member, means for driving said piston member in the opposite direction upon de-energization of said solenoid to discharge a measured amount of liquid from said housing, an inlet to said housing for supplying liquid to the inlet chamber of said housing during discharge stroke of said piston member, means affording communication between the inlet and outlet chambers during the reverse stroke of the piston, a back pressure valve housing in said inlet having a valve member which is unseated during flow of liquid into said dispenser housing but which prevents back flow of liquid from the dispenser housing during the reverse stroke of the piston, magnetic material carried by said valve member and in one position lying adjacent a wall of the back pressure valve housing, a second permanent magnet reciprocably mounted adjacent said wall, said magnet moving toward said last mentioned magnetic material upon seating of said valve member, an electric circuit controlled by said second permanent magnet, and coin lock relay means having an energizing circuit including said electric circuit, closure of said back pressure valve member opening said energizing circuit to deenergize said coin lock relay means.

2. A measuring liquid dispenser comprising a housing, a piston member movable in said housing from a retracted position to a projected position to discharge a measured amount of liquid from said housing, solenoid means for moving said piston member to retracted position, an energizing circuit for said solenoid, relay means controlling said energizing circuit, a holding circuit for said relay means, a permanent magnet operated switch controlling said holding circuit, magnetic material carried by said piston member for actuating said permanent magnet switch in retracted position of said piston member to open said holding circuit and release said relay means to deenergize said solenoid means, whereby said solenoid is deenergized when said piston member is moved to retracted position thereby, and coin-operated means controlling energization of said relay means to initiate discharge of said measured amount of liquid.

3. A measuring liquid dispenser comprising a dispenser housing having a discharge chamber, a piston movable within said discharge chamber and separating said chamber into an inlet chamber and an outlet chamber, magnetic material carried by said piston and movable with said piston from a position adjacent a wall of said housing to a remote position, a permanent magnet carried by said wall of said housing for cooperation with said magnetic material, means mounting said permanent magnet for reciprocation toward and away from said magnetic material, an electric circuit controlled by the reciprocation of said permanent magnet whereby movement of said piston member in said housing controls the opening and closing of said electric circuit by said permanent magnet, a solenoid for retracting said piston member toward said permanent magnet having an energizing circuit controlled by said permanent magnet and being opened upon full retraction of said piston member, means for driving said piston member in the opposite direction upon de-energization of said solenoid to discharge a measured amount of liquid from said housing, an inlet to said housing for supplying liquid to the inlet chamber of said housing during discharge stroke of said piston member, means affording communication between the inlet and outlet chambers during the reverse stroke of the piston, a back pressure valve housing in said inlet having a valve member which is unseated during flow of liquid from the housing, but which seats upon completion of said discharge stroke, a locking relay for preventing actuation of said solenoid during discharge stroke of said piston member, an energizing circuit for said locking relay, a second permanent magnet operated switch controlling said last mentioned energizing circuit for said locking relay, and magnetic material carried by said valve member for actuating said second permanent magnet switch in closed position of the valve to open said energizing circuit for said locking relay to permit reenergization of said solenoid.

4. A control circuit for a liquid dispenser wherein liquid flows into the dispensing chamber through the liquid supply conduit during the discharge of the measured quantity of liquid from the mechanism, comprising flow response means in the supply conduit movable in response to flow of liquid into the dispensing chamber, magnetic material carried by said flow response means, a permanent magnet vertically reciprocally mounted adjacent said supply conduit for interaction with said magnetic material in one position of the flow response means, an electric circuit controlled by said permanent magnet, and coin-lock relay means having an energizing circuit including said electric circuit, flow of liquid into said dispensing chamber moving said magnetic material to attract said permanent magnet upwardly to energize said coin-lock relay means, said permanent magnet moving by gravity to a lower position upon cessation of flow of liquid into said dispensing chamber to open the energizing circuit for said coin-lock relay means.

5. A measuring liquid dispenser comprising a dispenser housing having a dispensing chamber therein, a piston movable within said discharge chamber and separating the chamber into an inlet chamber and an outlet chamber, first magnetic means carried by said piston and movable with said piston from a position adjacent the wall of said housing to a remote position, second magnetic means carried by said wall of said housing for attraction by said piston-carried first magnetic means, means reciprocably mounting said second magnetic means for movement toward said first magnetic means when said first mentioned magnetic means is in its position adjacent said wall, solenoid means for reciprocating said piston and having an energizing circuit controlled by said second mentioned magnetic means, an inlet to said housing for supplying liquid to the inlet chamber of said housing during discharge stroke of said piston member, means affording communication between the inlet and outlet chambers during the reverse stroke of the piston, a valve member disposed in said inlet which is unseated during flow of liquid into said dispenser housing but which prevents back flow of liquid from the dispenser housing during the reverse stroke of the piston, third magnetic means carried by said valve member and in one position lying adjacent a wall of said inlet, and fourth magnetic means for attraction by said third magnetic means and reciprocably mounted adjacent said last mentioned wall, said third magnetic means moving toward said fourth magnetic means during seating of said valve member, an electric circuit controlled by said fourth magnetic means, and relay means having an energizing circuit controlled by said electric circuit, closure of said back pressure valve member opening said electric circuit to deactuate said relay means.

6. A control circuit for a liquid dispenser wherein liquid flows into the dispensing chamber through the liquid supply conduit during the discharge of a measured quantity of liquid from the mechanism, comprising flow response means in the supply conduit movable in response to flow of liquid into the dispensing chamber, first magnetic means carried by said flow response means, second magnetic means vertically reciprocably mounted adjacent said supply conduit for interaction with said first magnetic means and for attraction thereby in one position of the flow response means, an electric circuit controlled by said second magnetic means, and relay means having an energizing circuit controlled by said electric circuit, said first magnetic means moving away from said second magnetic means upon movement of said flow response means away from said one position to cause said second magnetic means to move by gravity to a lower position and to open the electric circuit controlling said relay means.

7. A measuring liquid dispenser comprising a dispenser housing having a dispensing chamber therein, a piston movable within said discharge chamber and separating the chamber into an inlet chamber and outlet chamber, first magnetic means carried by said piston and movable with said piston from a position adjacent a wall of the housing to a remote position, second magnetic means for attraction by said first magnetic means carried adjacent said wall of said housing, said housing enclosing said second magnetic means but accommodating vertical reciprocation thereof from an upper position to a lower position under the action of gravity and from a lower position to an upper position under the attraction of said first magnetic means, electric contacts controlled by movement of said second magnetic means, and solenoid means for controlling the movement of said piston and having an energizing circuit controlled by said electric contacts.

References Cited in the file of this patent

UNITED STATES PATENTS

| | | |
|---|---|---|
| 458,873 | Van Depoele | Sept. 1, 1891 |
| 750,115 | Orr | Jan. 19, 1904 |
| 1,264,554 | Peron | Apr. 30, 1918 |
| 1,348,842 | Barlow | Aug. 10, 1920 |
| 1,639,679 | Zsoldos | Aug. 23, 1927 |
| 2,234,982 | Ross | Mar. 18, 1941 |
| 2,249,236 | Tratsch | July 15, 1941 |
| 2,264,058 | Virgren et al. | Nov. 25, 1941 |
| 2,322,913 | Best et al. | June 29, 1943 |
| 2,324,262 | Lamb | July 13, 1943 |
| 2,427,429 | Waite et al. | Sept. 16, 1947 |
| 2,474,349 | Dickey et al. | June 28, 1949 |
| 2,521,723 | Hubbell | Sept. 12, 1950 |